United States Patent
Seeleitner

(10) Patent No.: US 10,282,845 B2
(45) Date of Patent: May 7, 2019

(54) DETERMINING A MARK IN A DATA RECORD WITH THREE-DIMENSIONAL SURFACE COORDINATES OF A SCENE, CAPTURED BY AT LEAST ONE LASER SCANNER

(71) Applicant: Carl Zeiss Industrielle Messtechnik GmbH, Oberkochen (DE)

(72) Inventor: Florian Seeleitner, Raubling (DE)

(73) Assignee: Carl Zeiss Industrielle Messtechnik GmbH, Oberkocken (DE)

(*) Notice: Subject to any disclaimer, the term of this patent is extended or adjusted under 35 U.S.C. 154(b) by 0 days.

(21) Appl. No.: 16/038,575

(22) Filed: Jul. 18, 2018

(65) Prior Publication Data

US 2019/0026899 A1  Jan. 24, 2019

(30) Foreign Application Priority Data

Jul. 19, 2017 (DE) .......................... 10 2017 212 371

(51) Int. Cl.
    *G06K 9/32* (2006.01)
    *G06T 7/13* (2017.01)
    (Continued)

(52) U.S. Cl.
    CPC .............. *G06T 7/13* (2017.01); *G06K 9/3216* (2013.01); *G06T 7/521* (2017.01); *G06T 7/596* (2017.01);
    (Continued)

(58) Field of Classification Search
CPC combination set(s) only.
See application file for complete search history.

(56) References Cited

U.S. PATENT DOCUMENTS 4,792,232 A * 12/1988 Jobe ........................ G01B 11/25
    348/128
5,557,410 A * 9/1996 Huber ................ G01B 11/2504
    348/E13.005

(Continued)

FOREIGN PATENT DOCUMENTS

DE      10137241 A1    9/2002
DE     102008034198 A1    1/2010

(Continued)

OTHER PUBLICATIONS

J. Peipe et al., "Optical 3-d coordinate measurement using a range sensor and photogrammetry," Proc. SPIE 5013, Videometrics VII (2003).

(Continued)

*Primary Examiner* — Tsung Yin Tsai
(74) *Attorney, Agent, or Firm* — Ewers & Hasselmann PLLC

(57) ABSTRACT

A method for determining a mark in a data record with three-dimensional surface coordinates of a scene includes ascertaining a first collection of edge points in a three-dimensional coordinate system of the data record, fitting an equalization area into at least a subset of the edge points of the first collection of edge points to permit the edge points in the three-dimensional coordinate system to be partly positioned on a first side of the equalization area and partly positioned on a second side, lying opposite the first side, of the equalization area, displacing edge points of the first collection of edge points into the equalization area to permit a corrected collection of edge points to be formed, and determining the mark in the three-dimensional coordinate system based on the corrected collection of edge points or the corrected closed circumferential edge line.

12 Claims, 7 Drawing Sheets

(51) Int. Cl.
*G06T 7/593* (2017.01)
*G06T 7/60* (2017.01)
*G06T 7/521* (2017.01)

(52) U.S. Cl.
CPC ........ *G06T 7/60* (2013.01); *G06K 2009/3225* (2013.01)

(56) References Cited

U.S. PATENT DOCUMENTS

| | | | |
|---|---|---|---|
| 7,149,337 B2 * | 12/2006 | Michaelis | G01B 11/2527 |
| | | | 382/141 |
| 7,359,538 B2 * | 4/2008 | Zeng | G06T 7/0012 |
| | | | 128/922 |
| 7,414,732 B2 | 8/2008 | Maidhof et al. | |
| 8,730,457 B2 | 5/2014 | Rothenberger | |
| 9,418,449 B2 | 8/2016 | Lilienblum et al. | |
| 9,846,933 B2 * | 12/2017 | Yuksel | G06T 7/001 |
| 2005/0190384 A1 | 9/2005 | Persi et al. | |
| 2009/0238449 A1 * | 9/2009 | Zhang | G01B 11/2536 |
| | | | 382/165 |
| 2013/0096873 A1 | 4/2013 | Rosengaus et al. | |
| 2015/0276397 A1 * | 10/2015 | Michaelis | G01B 21/047 |
| | | | 702/167 |

FOREIGN PATENT DOCUMENTS

| | | |
|---|---|---|
| DE | 102010060942 A1 | 6/2012 |
| DE | 102011113138 A1 | 10/2012 |
| DE | 102015214857 A1 | 2/2017 |
| WO | 0188471 A1 | 11/2001 |
| WO | 2014032661 A1 | 3/2014 |

OTHER PUBLICATIONS

COMET Photogrammetrie Systemhandbuch (Jun. 29, 2016).
Office Action issued in German Patent Application No. DE 10 2017 212 371.0 (from which this application claims priority), dated Jul. 20, 2018 and English language machine translation thereof.
COMET Photogrammetrie Systemhandbuch (Jun. 29, 2016) and English language translation thereof.

* cited by examiner

DETERMINING A MARK IN A DATA RECORD WITH THREE-DIMENSIONAL SURFACE COORDINATES OF A SCENE, CAPTURED BY AT LEAST ONE LASER SCANNER

CROSS REFERENCE TO RELATED APPLICATIONS

This application claims priority to German patent application DE 10 2017 212 371.0, filed Jul. 19, 2017, the entire content of which is incorporated herein by reference.

TECHNICAL FIELD

The invention relates to a method and an arrangement for determining a mark, which has at least one mark surface that is bounded by a closed circumferential edge, in a data record with three-dimensional surface coordinates of a scene. The surface coordinates of the scene are or have been captured by at least one laser scanner.

Scanning scenes by laser radiation is known. Here, electromagnetic radiation from at least one laser is radiated onto the scene. Depending on the scan configuration, corresponding portions of the scene can be irradiated at a certain time, for example, in punctiform or linear fashion, by the laser radiation. In order to capture larger portions of the scene, many smaller portions of the scene are irradiated in succession, the radiation reflected by the scene is captured and the information contained therein is processed. Capturing and processing of information can be carried out in different ways. By way of example, pulse times-of-flight of the laser radiation radiated onto, and reflected by, the scene can be captured, phase differences of the radiated and reflected laser radiation can be captured to form reference radiation, and/or the laser radiation reflected by the scene can be captured according to the triangulation principle. Depth information, i.e., information about the distance between the scanner and the scene, is obtained in all cases.

DE 10 2015 214 857 A1 describes a method for creating a three-dimensional model of the surroundings by laser scanning. In the process, a discrete set of scanned points, which is referred to as a point cloud, is formed. The coordinates of the measured points are ascertained from the angles and the distance in relation to an origin, for example the site of the laser scanner. Therefore, this laser scanner is a stationary laser scanner that is placed at the site. Typically, such laser scanners have a movable optical unit that deflects the laser radiation in different directions in succession, in particular by way of movable mirrors, such that the scene is scanned.

However, movable laser scanners that are guided by hand or machine are also known. The hand, or the movable machine part, to which the laser scanner is attached, moves the entire laser scanner, including the at least one laser contained therein, and thereby changes the location or the local area within the scene, onto which the laser radiation is irradiated. Naturally, movable optical units for changing the location and/or the direction of the laser radiation radiated onto the scene may also occur in the case of hand-guided or machine-guided laser scanners.

However, in the case of hand-guided or machine-guided laser scanners without a movable optical unit, it is sufficient to track the movement of the laser scanner in space by a tracking device and thus to determine the location and the alignment of the laser scanner at each instant of capturing the radiation reflected by the scene.

By processing the information obtained by capturing the radiation reflected by the scene, a three-dimensional point cloud arises, for example in the case of DE 10 2015 214 857 A1, i.e., the points of the point cloud contained in a three-dimensional coordinate system correspond to surface points of scene that were scanned by the laser scanner and hence captured. The point cloud can be uniquely described by an appropriate data record, in particular by a collection of digital and/or computer-processable data.

The present invention relates to such a data record, with the data record typically also describing meshing of points of the point cloud in addition to the point cloud, in particular in a manner known per se. In particular, many point triples of the point cloud can be meshed by way of straight-line connections to form triangles, wherein individual points can be vertices not only of a single triangle but can also be, and generally also are, vertices of further triangles. However, the mesh is not restricted to such a triangular mesh. Rather, corresponding groups of points of the point cloud can also be meshed to form quadrilaterals or polygons with a greater number of vertices, with each polygon bounding a plane face. Surface regions of the scanned scene in the data record can be described approximately by these plane faces, i.e., each plane face of the data record corresponds, in general, only approximately to the actual surface profile of the scene.

The invention relates, in particular, to scenes with at least one object produced in technical or industrial fashion, a workpiece. However, the term scene is not limited to a single workpiece. Rather, various workpieces can be arranged to form a scene, wherein individual workpieces can optionally adjoin one another and can further optionally be connected to one another. Examples of scenes that can be captured by laser scanners are parts of machines, chassis of automobiles or other vehicles, but also building parts, buildings or building groups. However, the field of application of the present invention is not restricted by these examples.

It has already been mentioned that laser scanners can be moved not only in hand-guided fashion but can also by a machine. Examples of appliances or machines that can move laser scanners for the purposes of capturing a scene are coordinate measuring machines (e.g., in a portal or gantry design), robots (in particular robots used during the manufacture of workpieces) and/or an appliance with an articulated arm, the laser scanner being fastened to the free end thereof. The machines/appliances can have at least one drive for driving a movement of the laser scanner.

It may be the case, or it is even regularly the case, that various portions of the scene are captured separately by the laser scanner, i.e., a corresponding data record of the surface points of the respective portion is produced in each case, particularly in the case of complex and large scenes, especially scenes that should be captured from different sides. In the case of overlapping captured portions of the scene, the common information contained in the overlapping regions can be used to combine the data records with one another. However, in some cases, it is complicated or not possible to capture sufficiently large common regions by a plurality of scans with the laser scanner. It is also possible, in principle, to track without gaps the position and alignment of the laser scanner relative to the scene over the entire period of all scans of portions of the scene by a tracking system. However, this assumes that the laser scanner is captured at each deployment site and without gaps during the movement between the various deployment sites or regions of use by the tracking system. This increases effort for the tracking and/or reduces the accuracy of the tracking.

Therefore, the practice of distributing marks, which are also referred to as targets, in the scene is known. Here, the marks can be arranged at the workpiece to be captured or the workpieces to be captured and/or separately thereof. In particular, areal, specifically two-dimensional plane marks and three-dimensional marks (i.e., bodies with dimensions in three dimensions) come into question as marks. Areal marks, in particular plane marks, are advantageous in that they can easily be applied directly at the workpiece or the workpieces or auxiliary objects such as stands, changing the scene only slightly in the process.

In the case of mutually overlapping scans, marks simplify the combination of the data records thereof; however, they also allow the combination of data records from scans that do not overlap one another in the case of additional information about the location and/or the alignment of the respective mark within the scene.

Determining the respective mark reliably and accurately from the data record is important for any evaluation of data records, also individual data records, from laser scanner scans that also captured marks in the scene. Determining a mark in the data record, i.e., the local regions in the three-dimensional coordinate system of the data record, which correspond to the captured surface regions of the real mark in the scene, should be effected as reliably and accurately as possible. When determining a mark, use can be made, in particular, of information, known in advance, about the mark and, optionally, about the position and/or alignment of the mark in the scene.

SUMMARY

It is therefore an object of the present invention to provide a method and/or an arrangement for determining a mark in a data record with three-dimensional surface coordinates of a scene captured by at least one laser scanner.

According to a basic concept of the present invention, at least one mark is determined in the data record, the mark having at least one mark surface bounded by a closed circumferential edge. Examples of the mark are known marks with a circular, plane surface or a circular plane surface region. However, the invention is not limited to determining such marks. By way of example, the at least one mark surface bounded by a closed circumferential edge may also have a different form. By way of example, marks with a plurality of polygonal surface regions, e.g., triangles, squares, rectangles or combinations of polygons with different numbers of vertices, are known. Each of these polygons forms a mark surface which, on its own, is bounded by a closed circumferential edge. In particular, two respectively mutually neighboring surface regions of the same mark may have a common edge portion; i.e., an edge portion of the edge of the one surface region is also an edge portion of the edge of the other surface region. However, marks with a plurality of surface regions that can be distinguished by a laser scanner, for example on account of different reflectivities for laser radiation, can not only have polygonal surface regions and/or surface regions bounded by round, in particular circular, edges that are arranged next to one another. Rather, a first surface region can be arranged, alternatively or additionally, wholly or in part within another surface region.

On account of the closed circumferential edge of the at least one mark surface of the mark, it is possible to reliably determine the mark surface in the three-dimensional coordinate system of the data record of a scan of the scene. However, at edges of such mark surfaces at which the reflectivity for the laser radiation of the laser scanner changes abruptly, it was found that errors in the positions of the corresponding captured edge points may occur in the data record. Such errors can systematically displace the edge points in a direction away from the correct profile of the edge line in the three-dimensional coordinate system of the data record.

A reason for such systematic errors can lie, in particular, in the geometry of the location or the local area at which the laser radiation is radiated by the laser scanner in the direction of the scene and of the location or local area at which the laser radiation reflected by the scene is received. Particularly if depth information (i.e., information about the distance between the laser scanner and the scanned surface region of the scene) is captured according to the principle of triangulation, an error in respect of the depth information captured by the laser scanner may occur, depending on the spatial orientation of a transition at the edge of a surface region of a mark from higher reflectivities for laser radiation to lower reflectivities for the laser radiation. As a result, edge points in the three-dimensional coordinate system of the captured data record may be incorrectly displaced to larger depth values or to smaller depth values depending on the aforementioned orientation.

It is therefore proposed to determine an edge in the three-dimensional coordinate system of the data record captured by a laser scan of the scene, the edge being formed by captured edge points corresponding to the closed circumferential edge of the captured mark surfaces as nodes. These edge points in the three-dimensional coordinate system of the data record generally correspond more or less accurately to edge points lying on an ideal captured image of the mark edge in particular on account of the described systematic errors; i.e., the image of the edge captured with the data record is typically deformed to a greater and lesser extent on a point-by-point basis.

Further, it is proposed to fit an equalization area into the captured edge points, wherein the equalization area approximately corresponds to the mark surface that is bounded by the closed circumferential edge of the mark. In particular, the equalization area can be a plane that is not bounded or only bounded by the outer boundaries of the data record, or a smaller plane area within the three-dimensional coordinate system of the data record. However, the equalization area can also be represented by an equalization edge line only, said equalization edge line approximately corresponding to the closed circumferential edge of the mark surface of the mark. In this case, the equalization line defines an area within which it is completely contained. By way of example, if the mark surface is a plane mark surface, the equalization line can define a plane equalization area. If, by contrast, the mark surface is a curved surface (e.g., a segment of a sphere surface), then the equalization line can define a correspondingly curved or differently formed non-plane surface. If the equalization line extends within a plane, there can optionally be stipulation, in advance, that such an equalization line defines the corresponding plane or plane area, in which it extends.

An arrangement in which the edge points, which form the nodes of the edge line ascertained in the three-dimensional coordinate system, are partly positioned on a first side of the equalization area and partly positioned on a second side, lying opposite the first side, of the equalization area is formed by fitting the equalization area into the edge line ascertained from the data record. In the case of the aforementioned systematic errors, groups of mutually adjacent edge points lie completely on one side of the equalization area, and so the edge line in this local region systematically deviates from the equalization area if at least one further group of edge points lies on the opposite side of the equalization area.

Edge points of the ascertained edge line are displaced into the equalization area, in particular in order to correct the aforementioned systematic errors. By way of example, what may occur depending on a possibly present raster of the coordinates of the data record is that the displaced edge points do not lie exactly in the equalization area. In any case, a corrected collection of edge points is obtained by displacing the edge points into the equalization area and hence a corrected closed circumferential edge line is formed, which corresponds to the closed circumferential edge of the mark surface that is represented in the data record by the ascertained edge points.

The mark surface can be determined in the three-dimensional coordinate system of the data record on the basis of the corrected collection of edge points or the corrected closed circumferential edge line. In particular, determining the mark surface and, optionally, also the mark can be the process of identifying the mark surface and/or the process of the determining at least one highlighted point that is uniquely defined by the mark surface and/or the mark, such as, for example, the circle center point of a circular mark surface or a common vertex of mutually adjoining polygonal mark surfaces. If the process relates to identifying the mark, it is possible to carry out the described method of ascertaining edge points and of displacing edge points for correction purposes for different mark surfaces of the same mark, such that the determined different mark surfaces are used to identify a mark, which is uniquely identifiable thereby, for example.

In particular, the following is provided: A method for determining a mark, which has at least one first mark surface that is bounded by a closed circumferential edge, in a data record with three-dimensional surface coordinates of a scene, wherein the surface coordinates of the scene are or were captured by at least one laser scanner and wherein the method includes the following steps:

ascertaining a first collection of edge points in a three-dimensional coordinate system of the data record, wherein each of the edge points of the first collection is defined by corresponding three-dimensional surface coordinates of the data record and wherein the edge points of the first collection of edge points form nodes of a first closed circumferential edge line, which corresponds to the closed circumferential edge of the first mark surface, fitting an equalization area into at least a subset of the edge points of the first collection of edge points such that the edge points in the three-dimensional coordinate system are partly positioned on a first side of the equalization area and partly positioned on a second side of the equalization area, lying opposite the first side, wherein the equalization area has a region that approximately corresponds to the first mark surface or the equalization area overall approximately corresponds to the first mark surface, displacing edge points of the first collection of edge points into the equalization area such that a corrected collection of edge points is formed, wherein the edge points of the corrected collection of edge points form nodes of a corrected closed circumferential edge line, which corresponds to the closed circumferential edge of the first mark surface, and wherein the corrected closed circumferential edge line has a greater number of nodes in the equalization area in comparison with the closed circumferential edge line, and determining the mark in the three-dimensional coordinate system on the basis of the corrected collection of edge points or the corrected closed circumferential edge line.

Further, an arrangement for determining a mark has at least one first mark surface that is bounded by a closed circumferential edge, in a data record with three-dimensional surface coordinates of a scene, wherein the surface coordinates of the scene are or were captured by at least one laser scanner and wherein the arrangement includes:

an ascertainment device configured to ascertain a first collection of edge points in a three-dimensional coordinate system of the data record, wherein each of the edge points of the first collection is defined by corresponding three-dimensional surface coordinates of the data record and wherein the edge points of the first collection of edge points form nodes of a first closed circumferential edge line, which corresponds to the closed circumferential edge of the first mark surface, an equalization device configured to fit an equalization area into at least a subset of the edge points of the first collection of edge points such that the edge points in the three-dimensional coordinate system are partly positioned on a first side of the equalization area and partly positioned on a second side of the equalization area, lying opposite the first side, wherein the equalization area has a region that approximately corresponds to the first mark surface or the equalization area overall approximately corresponds to the first mark surface, a displacement device configured to displace edge points of the first collection of edge points into the equalization area such that a corrected collection of edge points is formed, wherein the edge points of the corrected collection of edge points form nodes of a corrected closed circumferential edge line, which corresponds to the closed circumferential edge of the first mark surface, and wherein the corrected closed circumferential edge line has a greater number of nodes in the equalization area in comparison with the closed circumferential edge line, and a determination device configured to determine the mark in the three-dimensional coordinate system on the basis of the corrected collection of edge points or the corrected closed circumferential edge line.

In particular, the arrangement is configured to carry out the method in one of the configurations of the method described in this description. In particular, the arrangement can be realized by a computer or by a computer system, wherein devices of the arrangement are optionally locally distributed and connected to one another by data transfer links. Further optionally, the at least one laser scanner is also part of the arrangement. In this case, the laser scanner is connected, at least temporarily, to a data storage or a locally distributed data storage in order to transfer the data required to produce the data record and/or the data of the data record into the data storage or locally distributed data storage. Further, the computer or the computer system is connected to the data storage or the locally distributed data storage in this case, such that said computer or computer system has access to the data record stored therein. If the at least one laser scanner supplies data, from which the data record still has to be produced, then the computer or the computer system can be optionally configured to process the data supplied by the laser scanner and produce the data record.

Information, known in advance, about the mark and, in particular, the geometry (size and/or form) of the edge of the mark surface and/or the mark surface bounded by the edge can be used not only when fitting the equalization area, as mentioned above, but also, alternatively or additionally, when ascertaining the first collection of edge points in the three-dimensional coordinate system of the data record. In particular, form collections of edge points in the data record that are similar to the edge can be excluded as possible collections corresponding to the edge if the size of the edge line defined thereby does not correspond to the edge of the mark surface. However, the size also can be checked initially as an exclusion criterion and then a check can be carried out for the remaining potential edge lines in the data record to determine whether the form of the edge line in the data record sufficiently accurately corresponds to the form of the edge of the mark surface. In particular, a maximum value for the difference can be predetermined in view of the size. If the maximum value is exceeded, a decision is made that this does not relate to a correspondence between the corresponding data in the data record and the mark surface or the edge thereof. In regard to the form, an edge line, whose form equals the edge of the mark surface, can be fitted into the collection of edge points of the data record, for example. A decision can be made, in particular by statistical considerations, as to whether or not the collection of edge points corresponds to the edge of the mark surface.

When fitting the equalization area, it is possible to use all edge points of the collection of edge points or merely to use a subset of the edge points. By way of example, at least one edge point of the collection of edge points can be eliminated prior to fitting the equalization area if said edge point has a distance that is too far from an edge line that has the form of the closed circumferential edge of the mark surface.

The process of fitting an equalization area into a collection of points in a three-dimensional coordinate system is known per se and will therefore not be described in detail in this description. By way of example, statistical methods can be applied during fitting. The mean distance of the points of the collection of edge points from the equalization area can be minimized, for example, by iterative procedures. As a result, an equalization area is obtained, in respect of which the mean distance or the sum of the squares of the distances of the edge points of the collection is minimal. Alternative statistical procedures are known and may be applied. Procedures for determining the global minimum are also known and will therefore not be described here.

In order to ascertain the corrected collection of edge points and the corresponding corrected closed circumferential edge line in the data record, the edge points of the first collection of edge points are displaced into the equalization area. Particularly, if the equalization area is represented by an equalization line, the form and/or size of which corresponds to the edge of the mark surface, and which extends in a plane, then the edge points are typically displaced into the plane in a direction of respectively one surface normal of the plane. Therefore, the equalization area can be a plane equalization area. In particular, this corresponds to marks with a plane mark surface. However, a plane equalization area can also be used in the case of a curved mark surface, such as the aforementioned sphere surface segment, for example.

Not only in the mentioned case of the equalization area, which is defined by an equalization line, but also when using a plane equalization area, which is defined differently to by an equalization line, it is typical for the edge points of the first collection of edge points to be displaced into the equalization area by a displacement in a direction of respectively one surface normal of the equalization area. In principle, it is even possible in the case of curved equalization areas to displace the edge points in the direction of respectively one surface normal of the equalization area into the latter. However, it may be the case here that the displacement in different directions into the equalization area is possible. By way of example, it is then possible to use a further criterion to set the direction in which the edge point is displaced. By way of example, it may be sufficient to set that the edge point is displaced to the point in the equalization area lying closest thereto. If necessary, further or other criteria can be used for displacing the edge points into the equalization area.

In particular, as already known, the mark or the first mark surface can uniquely define at least one mark point. In this case, it is typical for the mark point to be determined in the three-dimensional coordinate system on the basis of the corrected collection of edge points or the corrected closed circumferential edge line. In particular, such a mark point is the already aforementioned point that is uniquely defined by the mark surface and/or the mark. Alternatively, or additionally, the mark point can be determined later, after carrying out the additional method steps described below. This facilitates an even more accurate determination of the mark point.

According to one method step, a set of points with surface coordinates of the scene is ascertained in the data record on the basis of the corrected collection of edge points or on the basis of the corrected closed circumferential edge line. The set of points lie along the equalization area within the corrected closed circumferential edge line but not on the first closed circumferential edge line or the corrected closed circumferential edge line. A second equalization area is fitted into the set of points such that the points of the set of points in the three-dimensional coordinate system are partly positioned on a first side of the second equalization area and partly positioned on a second side, lying opposite the first side, of the second equalization area.

The corrected collection of edge points or the corrected closed circumferential edge line renders it possible to ascertain the set of points of the data record that correspond to the mark surface. In principle, even if this is not typical, the first collection of edge points or an edge line corresponding to the first collection of edge points already allows ascertainment of the set of data points of the data record that correspond to the mark surface.

Typically, the set of points into which the second equalization area is fitted is only a subset of the points that are identified as points corresponding to the mark surface using the corrected collection of edge points, the corrected closed circumferential edge line, the first collection of edge points or the edge line corresponding to the first collection of edge points. In particular, the subset can be ascertained by virtue of points and, in particular, all points which—in relation to the second equalization area (e.g., if projected perpendicular into the second equalization area)—have a minimum distance from the edge points or the edge line or which have a maximum distance from a uniquely defined mark point (e.g., circle center point) of a circular mark surface or which lie within a region of predetermined form and size (in particular, in respect of the mark point, such as, e.g., within a rectangle or any other polygon with the mark point in the center) being ascertained. By way of example, in the case of the circle center point, the maximum distance can lie in the region of 70% to 80% of the circle radius. The uniquely defined mark point and further sizes (such as the circle radius, for example) that are required for ascertaining the subset can be ascertained by evaluating the corrected collection of edge points, the corrected closed circumferential edge line, the first collection of edge points and/or the edge line corresponding to the first collection of edge points. Therefore, a preliminarily valid circle center point and a preliminarily valid circle radius, for example, are ascertained in order to determine the subset.

The second equalization area fitted into the set of points can form a better approximation of the mark surface than the first equalization area since the previously determined edge points and/or the previously determined edge line do not belong to the set of points and outliers lying at the edge of the surface region, even if they were corrected by displacement into the first equalization area, regularly lead to a greater deviation of the equalization area from the actual mark surface. By restricting the set of points to a subset that lies in a central region of the set of points, such as within a circumference with 75% of the preliminarily determined circle radius, the second equalization area, as a rule, can be fitted even better to the mark surface.

In particular, after fitting the second equalization area, edge points of the first collection of edge points or edge points of the corrected collection of edge points can be displaced into the second equalization area such that a second corrected collection of edge points is formed, wherein the edge points of the second corrected collection of edge points form nodes of a second corrected closed circumferential edge line, which corresponds to the closed circumferential edge of the first mark surface.

If the set of points, into which the second equalization area was fitted, was ascertained using only the first collection of edge points and/or the edge line corresponding to the first collection of edge points, then it is possible to dispense with fitting the first equalization area. In any case, all details described in respect of the first equalization area in this description can also apply to the second equalization area. By way of example, the second equalization area can also be a plane equalization area and/or information, known in advance, about the mark and, the geometry (size and/or form) of the edge of the mark surface and/or the mark surface surrounded by the edge can be used when fitting the second equalization area. However, while the first equalization area is optionally fitted into at least one subset of the edge points of the first collection of edge points, the second equalization area is fitted into the set of points that correspond to the mark surface not at the edge but in a region lying within the edge.

As a rule, an improved approximation for the edge is obtained by displacing the first collection of edge points or edge points of the corrected collection of edge points into the second equalization area, which can be carried out in a manner corresponding to the displacement of edge points of the first collection of edge points into the first equalization area.

Optionally, using statistical methods, it is possible to ascertain a distribution of the distance of the set of points, into which the second equalization area is fitted, from the equalization area. Now, it is possible to apply a statistical criterion to determine whether, from a statistical point of view, this distance is too large. An example of a statistical criterion is the width or standard deviation of a Gaussian distribution of the distances of the points. If the statistical deviation is too large, a decision can be made to the effect of the equalization area not being a suitable area for approximating the mark surface and, in particular, the equalization area being ascertained by a set of points that do not correspond to the mark to be determined or the mark surface to be determined.

In particular, as mentioned above, the mark or the first mark surface can uniquely define at least one mark point and the mark point can be determined in the three-dimensional coordinate system on the basis of the second corrected collection of edge points or the second corrected closed circumferential edge line.

Aforementioned details relating to determining the mark point on the basis of the first corrected collection of edge points can accordingly also apply to determining the mark point on the basis of the second corrected collection of edge points.

In particular, the mark can be a mark whose first mark surface bounded by a closed circumferential edge is a surface with a higher reflectivity for a laser radiation of the laser scanner than at least one second mark surface that lies beyond the closed circumferential edge in respect of the first mark surface and that adjoins the closed circumferential edge, the second mark surface consequently having a lower reflectivity for the laser radiation. This facilitates scanning the mark surface by the laser scanner, and producing a corresponding data record, in a way that is evaluable in a reliable and accurate manner.

In particular, an illumination of the scene by the laser scanner can be set to be so weak that the laser scanner captures no surface points from the second mark surface, wherein the edge points of the first collection of edge points are ascertained by virtue of taking account of the fact that the data record contains no directly neighboring surface points that lie in a region of the three-dimensional coordinate system corresponding to the second mark surface. The edge points of the first collection of edge points can be ascertained in a particularly reliable manner and in a particularly simple manner, particularly in the case of an interconnection of the points of the data record in the aforementioned manner, where connecting lines between points of the network mean a neighborhood of the points connected to one another. The edge points of the first collection of edge points are distinguished in relation to points within a surface in that neighboring points, which correspond to the second mark surface, are missing.

As an alternative or in addition to the described weak illumination of the scene by the laser scanner, the laser scanner can capture surface points of the second mark surface. However, when processing the information of the scene captured by the laser scanner, it is possible to determine on the basis of the low intensity of the radiation reflected by the second mark surface that the surface points of the second mark surface do not belong to the first mark surface. This, too, facilitates a particularly reliable determination of the edge of the first mark surface.

Illuminating the scene by the laser scanner with such weak radiation that the laser scanner captures no surface points of the second mark surface can also be carried out, and corresponding data from the scene can be produced, if the method for evaluating the data record, described in this description, is not carried out and, instead, a different method, for example, is carried out to determine the mark or to evaluate the data in a different way.

A weak illumination of the scene by the laser scanner can be achieved by virtue of the illumination (i.e., laser radiation), radiated onto the scene for recording an individual point or a plurality of simultaneously recorded points of the scene, being restricted to a correspondingly short illumination time interval. Then, illumination is brought about again in order to record a further point or, simultaneously, a plurality of further points of the scene. Alternatively, or additionally, the duration of the time interval during which a recording device of the laser scanner (a camera, in particular) records laser radiation reflected by the scene and during which the amount of radiation incident during the time interval is integrated can be so short that the considered illumination of the scene by the laser scanner is weak. Even if this is not typical, a weak illumination of the scene by the laser scanner can also be obtained by virtue of the radiant intensity, the radiation flux density, emanating from the actual laser, i.e., the radiation source of the laser scanner, being set to be weak. In any case, a weak illumination of the scene can be achieved by virtue of the illumination being set to be ever weaker, in either a step-wise or a continuous manner, until the laser scanner no longer captures any surface points from the second mark surface. A corresponding value of the setting can also be set again at a later point in time in the case of further scans of the scene for the purposes of determining the mark.

In particular, the scene can be, successively through respectively one spatial region, simultaneously irradiated by laser radiation when capturing the surface coordinates of the scene, wherein the spatial regions have straight lines of intersection with their cross-sectional areas such that the laser scanner simultaneously records measurement points of the surface coordinates of the scene that are arranged successively along a line-like profile of the respectively simultaneously illuminated surface region of the scene. In principle, such scanning is already known.

When ascertaining a collection of edge points, in particular the first collection of edge points, in the three-dimensional coordinate system of the data record and/or when fitting the first and/or second equalization area into at least one subset of the edge points of the first collection of edge points, it is possible, in this case, to take into account that the closed circumferential edge of the first mark surface is captured more accurately on account of the line-like profile of the laser scanner when the closed circumferential edge intersects the line-like profile at an angle of intersection deviating less from 90 degrees than if the closed circumferential edge intersects the line-like profile at an intersection angle deviating more from 90 degrees or if the closed circumferential edge is tangential to the line-like profile.

In particular, it is possible to initially ascertain a collection of edge points and then to ascertain the angle at which the line-like profile intersects the edge, in particular by taking into account information, known in advance, about the form and/or the size of the edge. Typically, for at least one further step of processing the collection of edge points, those edge points at whose position the line-like profile intersects the edge line at an intersection angle that deviates by more than a predetermined absolute value from 90° are excluded from the collection.

In any case, considering the deviation of the intersection angle from 90° allows the further evaluation of the collection of edge points to be carried out in a way which leads to more exact results when determining the mark. An alternative to excluding edge points from the collection of edge points for the further processing consists of weighting the points of the collection of edge points to different extents during the further processing. By way of example, this relates to fitting the first equalization area, ascertaining the points lying within the edge line which correspond to the mark surface, determining the uniquely defined mark point and/or determining the mark surface, in view of form and/or size.

Just like the above-described method for scanning a scene by the laser scanner with weak illumination, the method for scanning the scene described below also can be carried out prior to the evaluation of the obtained data record. However, it can also be carried out if the evaluation, described in this description, of the data record is not carried out or carried out in a different way.

The method, described below, during the scanning of the scene by the laser scanner assumes that surface coordinates of the scene are successively captured in a first and a second capture process, wherein the second capture process is carried out before or after the first capture process, and wherein the first capture process obtains the data record that is used to determine a mark and the second capture process obtains a data record, from which surfaces of the scene outside of the mark arranged in the scene or outside of the marks arranged in the scene are determined. Therefore, the actual surface information of the scene is ascertained in the second capture process. The proposition now is that:

the laser scanner captures reflected radiation of the scene with a lower amount of radiation per captured solid angle in the first capture process than in the second capture process, a frequency of a repeated irradiation of the scene by laser radiation and capture of the radiation reflected by the scene by the laser scanner is higher in the first capture process than in the second capture process, a recording device of the laser scanner receives and records reflected laser radiation from a smaller solid angle range in the first capture process than in the second capture process, and/or a local resolution during a simultaneous capture of the radiation reflected by the scene by the laser scanner is lower in the first capture process than in the second capture process.

In all these cases, which can also be combined with one another, the first and the second capture processes differ and the first capture process is adapted to capturing marks in this way. The first-mentioned case, in which the laser scanner captures reflected radiation with a lower amount of radiation than in the second capture process is the above-described case, in which the laser scanner captures the scene with weak illumination. Particularly in the case of marks with a strongly reflecting mark surface, which has a higher reflectivity for laser radiation than at least one other mark surface and/or an adjoining region of the scene, the mark surface can be captured and evaluated well, as described above.

According to the second aspect of the invention, with the higher frequency of the repeated irradiation of the scene in the first capture process, the grid of the scan produced by the movement can have smaller distances between successively captured surface regions of the scene, particularly in the case of hand-guided or machine-guided, i.e., moved, laser scanners. As a result, the mark or the marks can be scanned more accurately.

According to a third aspect of the invention, with the smaller solid angle range, at least one mark can be captured within the solid angle range but surface regions outside of the smaller solid angle range can be neglected. As a result, the evaluation of the captured data is accelerated.

According to a fourth aspect of the invention, with the lower local resolution while simultaneously capturing surface regions of the scene, the amount of data for determining the mark surface is reduced. This is based on the concept that, particularly in the case of the above-described scans of the scene with the line-like profile of the illumination radiated from the laser scanner onto the scene, the distance between the simultaneously captured points is, as a rule, so small that the local resolution for capturing the scene outside of the marks is very good. However, the high local resolution along the line-like illumination is not required, and can be reduced, when capturing the marks. The local resolution along the line-like profile deviates less strongly from the local resolution across the line-like profile when the laser scanner is a laser scanner that is moved in a hand-guided or machine-guided manner.

A further aspect of the invention, which, in particular but not necessarily, needs to be applied in combination with the method of evaluating the data record, relates to information about the scene from other sources. Here, in particular, sources are understood to mean the capture by other methods than by a laser scan. By way of example, capturing scenes by photogrammetry is known. Here, information about the scene are initially captured and recorded in a two-dimensional coordinate system. The object of the capture lies in obtaining three-dimensional information about the scene. The term photogrammetry includes various measurement methods and evaluation methods. In particular, it is possible to use stereo image methods, i.e., the use of one- or two-dimensional images from different viewing angles on the scene, and/or projection methods, in which illumination patterns are radiated onto the scene. What is common to all methods of photogrammetry is that additional depth information is obtained in relation to one- or two-dimensional images of the scene, i.e., information about the distance of the camera from the respective surface point of the scene.

Capturing marks that are attached in the scene, at and/or next to the actual objects to be examined of the scene by photogrammetry is also already known. By way of example, in the case of a circular mark surface, the two-dimensional image is, as a rule, an ellipse. The center point of the circle, however, can be determined therefrom with great accuracy. By way of example, in relation to the capture of marks by hand-guided laser scanners, a more accurate determination of the position of a mark point uniquely defined by the respective mark is possible these days. In relation to a camera that is used for capturing the scene in photogrammetry, such mark points are successfully determined with a local resolution that is greater than the dimensions of the camera pixels of the digital camera.

However, the local resolution when determining depth information between or away from the marks in the scene is greater in the case of laser scanners than in the case of photogrammetry. Therefore, combining the method described herein for evaluating data records that are or were produced by a laser scanner with the evaluation of photogrammetry data is proposed. In particular, at least one mark in a scene captured by the laser scan is determined in the data record of the laser scan and the three-dimensional coordinate system of the data record is registered to a photogrammetry coordinate system, i.e., the necessary transformation between the coordinate systems is ascertained and, optionally, carried out as well. In particular, this allows information from the coordinate system of the photogrammetry data about the mark and typically about a plurality of marks in the scene to be made available in the three-dimensional coordinate system of the laser scanner data and/or the information from the data record from the laser scan can be made available in the coordinate system of the photogrammetry data. This allows, in particular, the information from the photogrammetry, which may be more accurate in relation to the position of the marks in the scene, to be combined with the depth information from the laser scan of the scene, which may be more highly resolved in relation to. Alternatively, or additionally, information from different laser scanner scans of non-overlapping surface regions of the scene can be made available in a coordinate system that is common to the various laser scanner scans (e.g., a coordinate system of the scene, i.e., the coordinate system is stationary in relation to the scene) by the marks in the scene determined by evaluating the photogrammetry data.

By way of example, the entire scene or a majority of the surface of the scene is captured and evaluated by photogrammetry such that the position and/or alignment of a plurality of marks in the scene is known in a first three-dimensional coordinate system of the scene from the photogrammetry. By determining the position and/or alignment of at least some of the same marks, which are also determined by photogrammetry, from the respective laser scanner scan, it is possible to ascertain the position and/or the alignment that the marks captured by the laser scanner have in the first three-dimensional coordinate system. Here, in particular, it is possible in each case to define a second three-dimensional coordinate system for each laser scanner scan, in respect of which the respective data record is present as a result of the laser scanner scanning process. These data records can respectively be evaluated for determining the mark within the procedure as described herein. Subsequently, it is possible to carry out the registration of the first three-dimensional coordinate system of the scene to the individual two-dimensional coordinate systems of the laser scanner scans, i.e., it is possible to ascertain the corresponding transformations. As a result, the information from the various laser scanner scans is made available in the first three-dimensional coordinate system of the scene.

The proposition is not restricted to this use of coordinate systems. Instead, the photogrammetry data, for example, and the data from the various laser scanner scans alternatively can be all transformed into a third three-dimensional coordinate system. In this case, the results of the photogrammetry and the various laser scanner scans are initially present in each case in respect of another coordinate system, which is not the third three-dimensional coordinate system. By way of example, these other coordinate systems can be coordinate systems that relate to the respective scanning apparatus (e.g., camera or camera arrangement of the photogrammetry and of the laser scanner).

Further, it is possible to make available color information obtained from the photogrammetry, i.e., information about the spectral distribution of the radiation reflected and/or emitted by the scene, together with the information from the laser scan or the various laser scanner scans, e.g., in the first three-dimensional coordinate system of the scene or the third three-dimensional coordinate system.

The at least one laser scanner can be moved in a hand-guided and/or machine-guided manner relative to the scene and the movement can be tracked by a tracking system not only in the case where the results of at least one laser scanner scan are combined with photogrammetry data. In particular, the tracking can be realized by triangulation, for example, by two cameras that are arranged at a distance from one another and that in each case continuously record images of the laser scanner. As an alternative or in addition thereto, the laser scanner can emit a signal to the tracking system, on the basis of which the tracking system continuously ascertains the position and/or the alignment of the laser scanner, in particular in a three-dimensional coordinate system of the scene. In the case of a laser scanner that is moved by a coordinate measuring machine, a robot or a machine tool, it is possible to ascertain the position and/or alignment of the laser scanner from the position measurement system of the appliance or the machine.

BRIEF DESCRIPTION OF THE DRAWINGS

Exemplary embodiments of the invention will now be described with reference to the accompanying drawing wherein.

DESCRIPTION OF EXEMPLARY EMBODIMENTS

Figure 1:
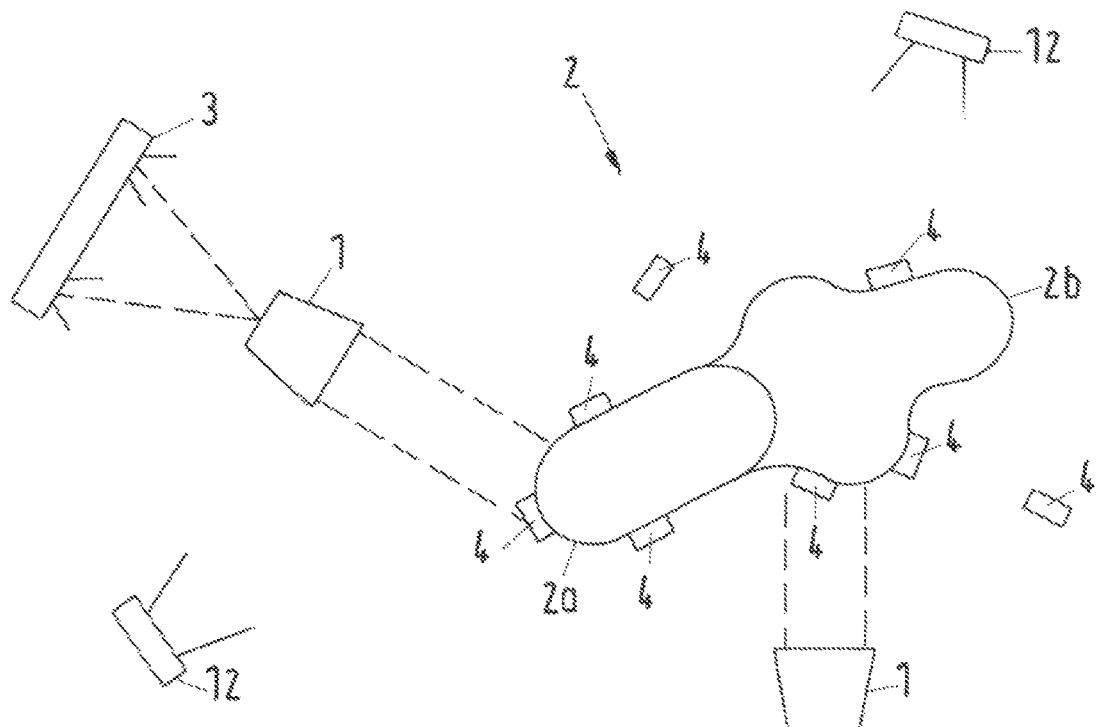
FIG. 1 schematically shows a plan view of a scene, wherein various surface regions of the scene are successively scanned by a laser scanner.

FIG. 1 schematically shows a scene 2 which has two interconnected workpiece parts 2a, 2b. The schematic illustration in FIG. 1 should be understood to be a two-dimensional view of the scene and further devices, i.e., the scene 2 takes up a three-dimensional spatial region.

The surface of the scene 2 is scanned by a laser scanner 1 in various relative positions and relative orientations of the laser scanner 1 in relation to the scene 2. During the scanning, the laser radiation radiated from the laser scanner 1 onto the scene 2 is moved over the surface of the scene 2. Here, reflected laser radiation from a multiplicity of surface points of the scene 2 is captured by the laser scanner 1 and the coordinates of the surface point are ascertained in a three-dimensional coordinate system of the laser scanner 1 for each of the captured surface points.

Figure 9:
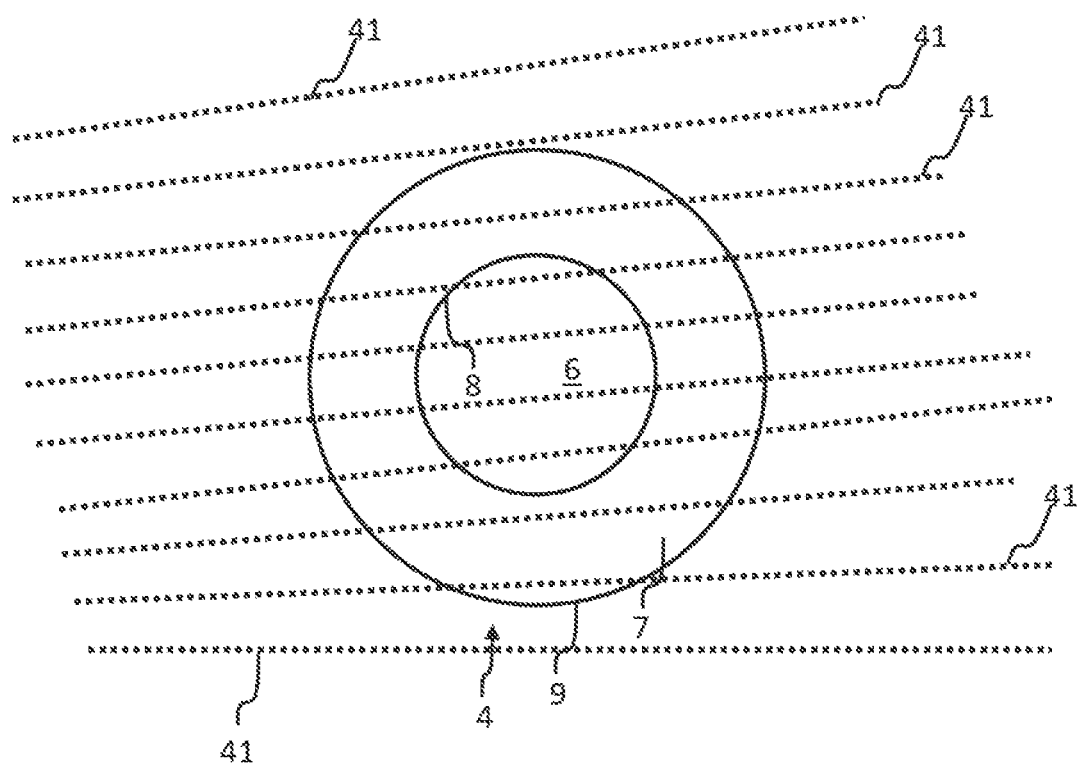
FIG. 9 shows a plurality of straight lines, along which a plurality of recorded surface points of a scene are arranged in each case, wherein some of the straight lines intersect the mark illustrated in FIG. 2.
Figure 10:
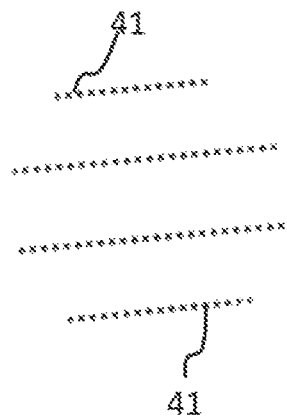
FIG. 10 shows sections of four of the straight lines which, in the illustration of FIG. 9, are located within the circular area of the mark.
Figure 11:
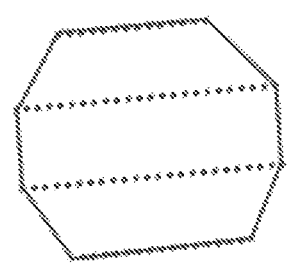
FIG. 11 shows a first closed circumferential edge line for the four sections of the straight lines illustrated in FIG. 10, the edge line corresponding to a first approximation of a circular line that forms the outer edge of the circular area of the mark.

In particular, the laser scanner 1 is a hand-guided laser scanner that, for example, illuminates a spatial region having a straight line in the cross section, i.e., approximately perpendicular to the beam propagation direction of the laser radiation, at all times during scanning. The surface points of the scene that can be captured simultaneously by the laser scanner are therefore located on straight lines emanating from the laser scanner. The straight lines intersect such a straight cross-sectional line at a distance from their neighboring points of intersection according to the local resolution of the laser scanner. Corresponding distributions of captured surface points are schematically illustrated in FIGS. 9 to 11 which will be described in more detail below.

In the case of a laser scanner that captures the depth information of the surface of the scene by triangulation, the connecting lines of the simultaneously captured surface points generally no longer intersect straight-lined cross-sectional lines in relation to the reception device of the laser scanner for the reflected laser radiation. This is only the case for plane surface regions of the scene. Curved and angled surface regions distort the cross section in relation to the reflected radiation.

However, capturing the scene 2, illustrated in FIG. 1, by the laser scanner 1 is not restricted to such line scanners with triangulation. Instead, use can be made of any laser scanner. Additionally, the scene can be successively scanned not only using the same laser scanner 1. Instead, scanning can be carried out simultaneously and/or in succession using a plurality of laser scanners and/or by an optical unit which guides the laser radiation radiated onto the scene onto different surface regions of the scene 2 simultaneously and/or in succession.

The position and the alignment of the laser scanner 1 are ascertained by a tracking system 3 in the exemplary embodiment illustrated in FIG. 1. FIG. 1 indicates the exemplary embodiment of the tracking system 3 with at least one device that determines the position and alignment of the laser scanner 1 by triangulation. In particular, further such devices can be present as part of the same tracking system, for example in order to capture the laser scanner 1 in the position illustrated at the bottom of FIG. 1.

Moreover, FIG. 1 schematically illustrates two cameras 12, by which the scene 2 is optionally captured in addition to the at least one laser scanner. Photogrammetry likewise allows three-dimensional information about the surface profile of the scene 2 to be determined from the images of the scene 2 recorded by the cameras 12. The illustration of two cameras 12 or the same camera 12 in various relative positions and relative alignments in relation to the scene 2 should be understood to be schematic. It is possible to use more, or fewer, cameras than illustrated.

In order to facilitate or simplify the capture of the scene 2 by the at least one laser scanner 1, a plurality of marks 4 are placed in the scene 2. The marks 4 can be fastened directly to the surface of the workpiece or the workpieces 2a, 2b, the surface of which is scanned by the laser scanner. However, as indicated by two of the marks 4, which are not in contact with the workpieces 2a, 2b, additional marks 4 can be placed in the scene 2. In practice, a very much larger number of marks can be placed in the scene than is illustrated in FIG. 1. Typically, at least three marks and, typically, a much larger number of marks, e.g., twelve or more marks, are located in each surface region that is captured during a laser scanner scan. The marks 4 can be both marks with the same configuration, the images of which cannot be distinguished without additional information, and marks with identification features that can be uniquely ascertained from the data captured by the at least one laser scanner.

Figure 2:
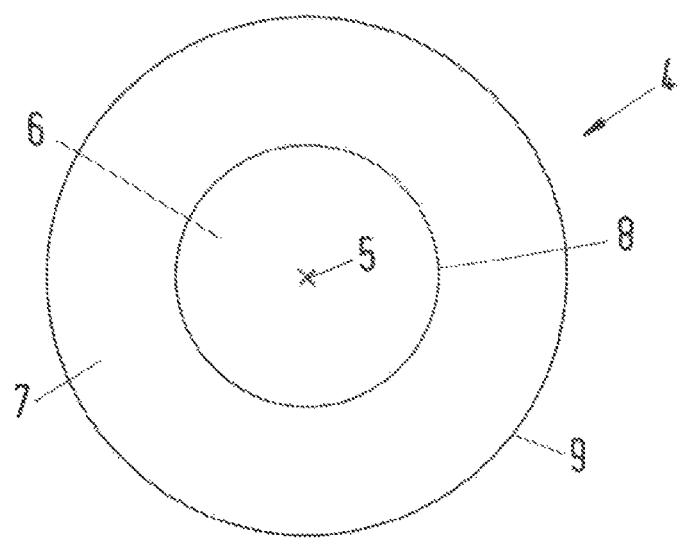
FIG. 2 shows an exemplary embodiment of a mark with a circular more strongly reflecting area and a circular-ring-shaped, concentric less strongly reflecting surface, FIG. 3 schematically shows an arrangement with a laser scanner, an evaluation device for evaluating the signals, produced by the laser scanner, from scanning a scene and with a data storage.

By way of example, the marks are marks with a two-dimensional, plane surface. An example of such a mark is illustrated schematically in FIG. 2. In FIG. 2, the mark 4 has a central circular mark surface 6 which has a closed circumferential edge 8 in the form of a circular line. The circle center point 5 is only illustrated for elucidating the mark 4 in FIG. 2. In its exemplary embodiment, the mark 4 does not have any special feature in the circle center that indicates the location of the circle center point 5.

The circular mark surface 6 is surrounded by a circular ring 7, which is concentric in relation to the circle center point 5 and which, once again, has a closed circumferential edge 9 in the form of a circular line. Over its entire surface, the mark surface 6 has a higher reflectivity for laser radiation of the laser scanner than each surface point within the circular ring 7, which can be considered to be a second mark surface. In particular, the first mark surface 6, the circular area, is "white", i.e., it has a continuously very high reflectivity of more than 90%, typically more than 95%. By contrast, the second mark surface 7, the circular ring, is typically "black", i.e., it continuously has a very low reflectivity of less than 10%, typically less than 5%.

The invention is not restricted to the use of the mark 4 illustrated in FIG. 2 and the determination thereof. Exemplary embodiments of other marks have already been described.

Figure 3:
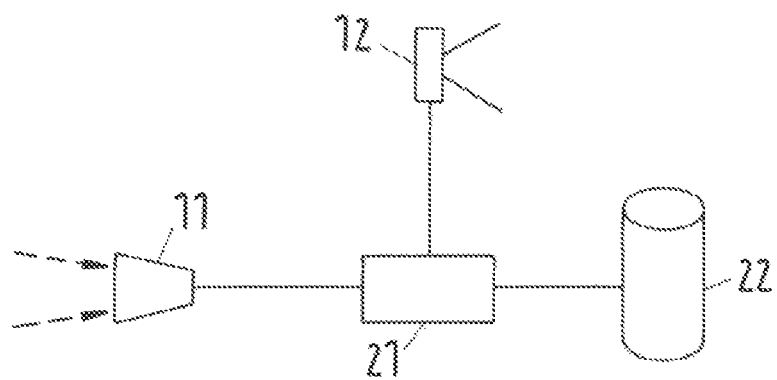

The schematic illustration in FIG. 3 shows that the part 11 of the laser scanner that receives the laser radiation reflected by the scene is connected to an evaluation device 21, which can be integrated in the laser scanner, which is, e.g., embodied in a movable manner, and which can be partly integrated therein or which can be arranged separately. The evaluation device 21 evaluates the laser radiation received from the reception device of the laser scanner and/or the information extracted therefrom about the surface of the scanned scene and generates the data record with three-dimensional surface coordinates of the scene. Naturally, the surface points of the scene defined by the three-dimensional surface coordinates are only located in the surface region of the scene captured by the laser scanner scan. This does not preclude different surface regions of the scene being scanned successively and/or by different laser scanners and one such data record being produced in each case, or that the results from various laser scanner scans are combined to form a common data record. The data record or the data records can be stored in the data storage 22 which is schematically illustrated in FIG. 3, and to which the evaluation device 21 is connected. Therefore, the evaluation device 21 can store the results of its evaluation in the data storage 22 and can re-access the results, in particular for determining one or more marks that are part of the scene.

Optionally, at least one camera 12 of a photogrammetry system can also be connected to the evaluation device 21 such that the evaluation device 21 can produce or receive results of a photogrammetry of the scene and can combine these with results of the laser scanner scan(s).

Figure 4:
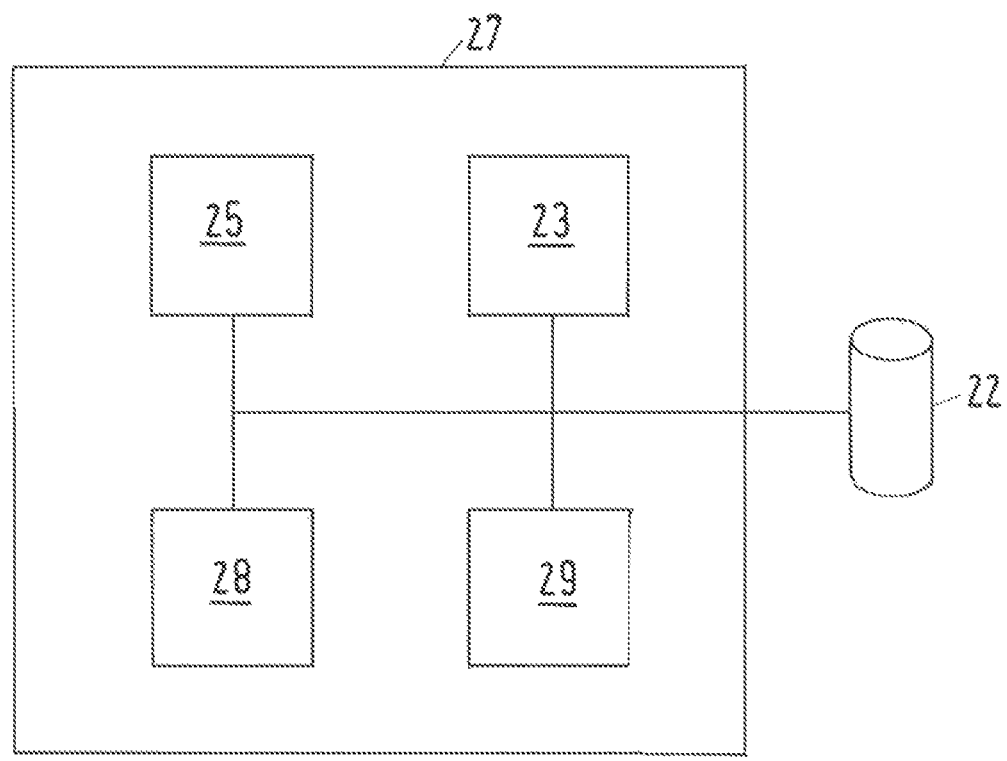
FIG. 4 shows an exemplary embodiment of the evaluation device illustrated in FIG. 3.

FIG. 4 shows a schematic arrangement 27 for determining a mark. In particular, the arrangement 27 can be part of the evaluation device 21 shown in FIG. 3. The evaluation device 21 and the arrangement 27 can be realized by a computer or a computer system.

The arrangement 27 has an ascertainment device 23 for ascertaining at least one collection of edge points in a three-dimensional coordinate system of a data record, which contains the three-dimensional surface coordinates of a scene captured by the laser scanner or laser scanners. Each of the ascertained edge points of the collection is defined by corresponding three-dimensional surface coordinates of the data record, wherein the edge points form nodes of a closed circumferential edge line, which corresponds to the closed circumferential edge of a mark surface of a mark in the scene. As indicated by connecting lines in FIG. 4, the ascertainment device 23 is connected to a data storage 22 to be able to access one or more data records stored in the data storage 22. The data storages 22 illustrated in FIGS. 3 and 4 can be the same data storage.

Further, the arrangement 27 includes an equalization device 25, which is configured to fit an equalization area into at least one subset of the edge points, which were ascertained as a collection of edge points by the ascertainment device 23. The equalization area includes a region that approximately corresponds to the mark surface of the mark in the scene, or the equalization area overall corresponds approximately to the mark surface. The equalization device 25 is connected to the ascertainment device 23, for example, via a data bus as indicated in FIG. 4. Alternatively, it is possible that not only the ascertainment device 23 and the equalization device 25, but also further devices of the arrangement 27, which are illustrated in FIG. 4, are realized as computer programs, as parts of a common computer program, and/or by one or more data processors, wherein at least one data processor can realize more than one of the devices.

The arrangement 27 further includes a displacement device 28, which displaces edge points of the ascertained collection of edge points into the equalization area such that a corrected collection of edge points arises. The corrected collection of edge points forms nodes of a corrected closed circumferential edge line. The displacement device 28 is connected to the ascertainment device 23 and/or the equalization device 25, at least in order to obtain information about the edge points and the equalization area.

Further, the arrangement 27 includes a determination device 29 configured to determine the mark in the three-dimensional coordinate system. In particular, the determination device determines the mark on the basis of the corrected collection of edge points or a closed circumferential edge line corresponding to the corrected collection of edge points. In particular, determining the mark includes determining the position and alignment of the mark in the three-dimensional coordinate system of the data record. As an alternative, or in addition thereto, at least one mark point, which is uniquely defined by the mark or the mark surface, can be determined on the basis of the corrected collection of edge points or based on the corrected closed circumferential edge line.

Figure 5:
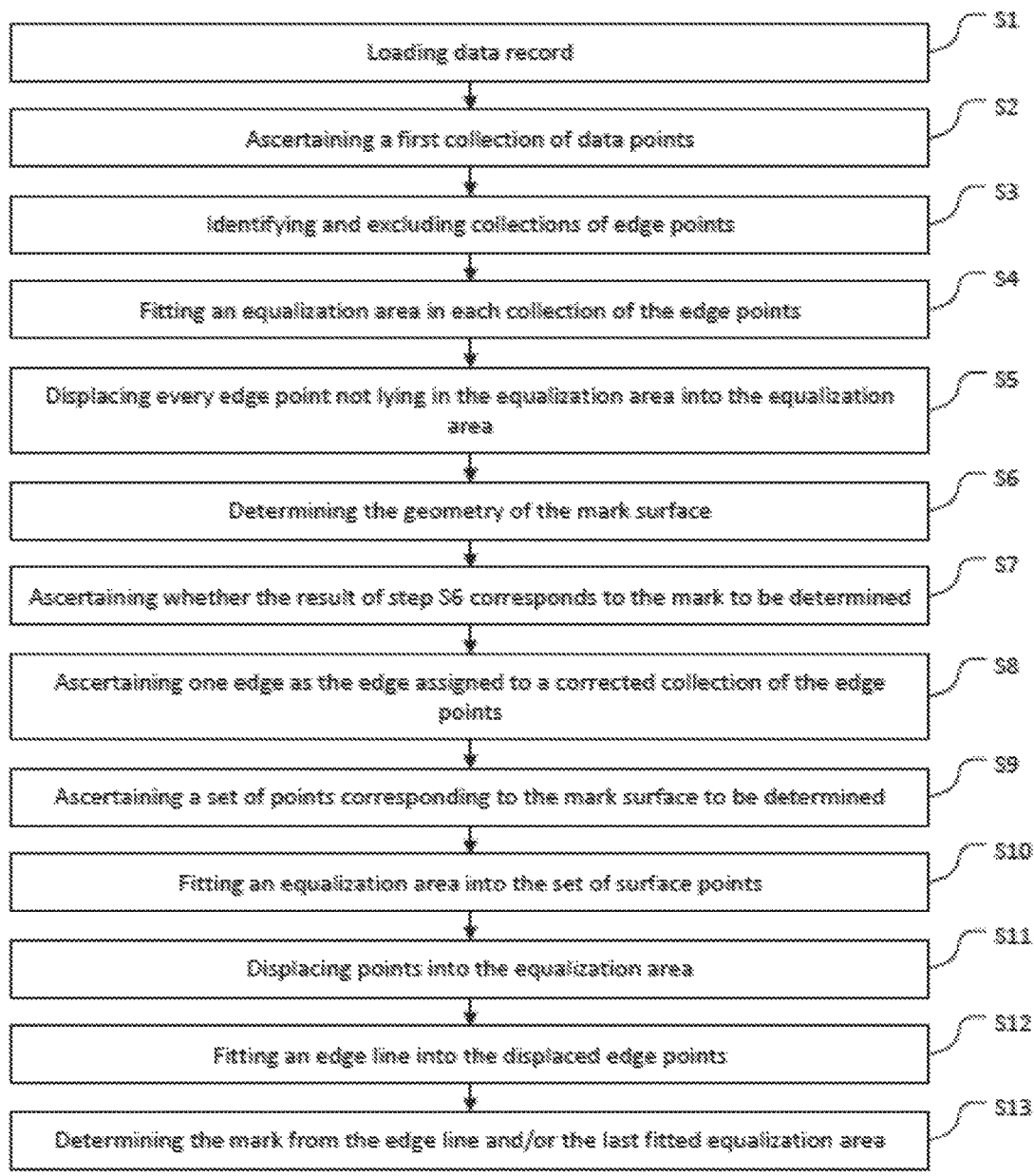
FIG. 5 shows a flowchart of a method for determining a mark from a laser scanner data record.

FIG. 5 shows a simple flowchart of successive method steps. Each of these steps can be implemented after a preceding illustrated method step and before a subsequent illustrated method step in each case. However, there are method steps which can be carried out purely optionally, i.e., which can be omitted. It is also possible to return to an earlier step in the procedure and to repeat the step in relation to the same data record or in relation to the same mark surface, the surface points of which are captured by points in the data record. It is also possible to carry out at least individual sequences of the steps in relation to at least one second mark surface of the same mark or another mark at the same time as the steps in respect of the first mark surface, or thereafter. In particular, a data record obtained by a laser scanner scan includes a plurality of collections of edge points. It is not known in advance whether said edge points are edge points corresponding to the edge of a mark surface. It is therefore an object of the exemplary method with the steps illustrated schematically in FIG. 5 to recognize edge points or groups of edge points as points not corresponding to a closed circumferential edge of a mark surface and to exclude these from the processing in subsequent method steps.

Figure 6:
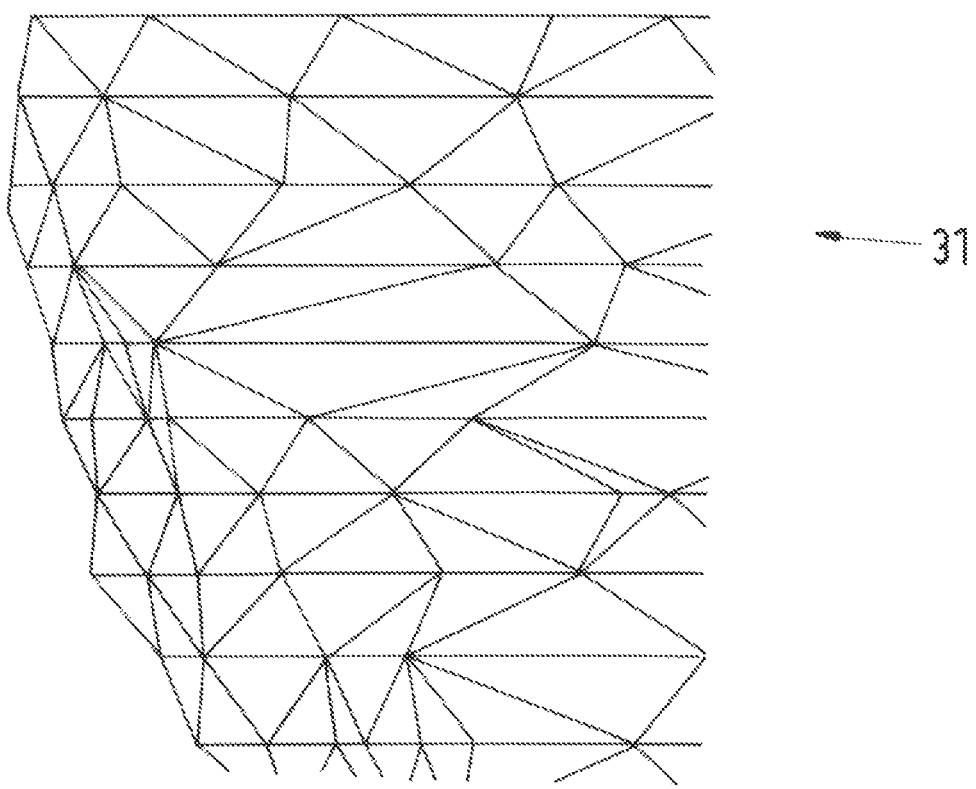
FIG. 6 shows a two-dimensional illustration of a section of a data record with surface points of a scene, wherein the surface points are connected to adjacent surface points by straight-lined connections which results in a mesh.

An example of a two-dimensional illustration of a subset of surface points, the coordinates of which are contained in the data record which is evaluated by the method yet to be described based on FIG. 5, is illustrated in FIG. 6. The two-dimensional section 31 of the data record relates to a perpendicular projection of surface points in the three-dimensional coordinate system of the data record into the image plane of FIG. 6. Here, this only relates to those points that are located in the vicinity of the image plane, i.e., the projection plane, and that were identified as points neighboring one another by preprocessing of the information about the surface of the scene produced by the laser scanner. The triangle mesh structure that can be identified in FIG. 6 has at each vertex of one of the illustrated triangles one of the surface points of the scene contained in the data record, i.e., a result of capturing the surface point by the laser scanner. Directly neighboring surface points are connected to one another by a straight line in each case. The straight line forms an edge of a triangle. In the exemplary embodiment, all captured surface points are located on one of the lines that extend approximately parallel to one another and that extend approximately horizontally in the illustration of FIG. 6. These lines correspond to the illumination of the scene that has a straight-lined cross section, which was already described above.

In the left-hand part of the section 31, the lines extending approximately in horizontal fashion in each case end at an endpoint which has two directly adjacent neighboring points on the closest neighboring lines extending approximately in horizontal fashion, but only has one direct neighbor on the same line extending approximately in horizontal fashion as itself. In the extent of the horizontally extending line, these endpoints are the last points within the same mark surface. Although surface points of the scene may be located along a continuation to the left of the lines extending approximately in horizontal fashion in the illustration of FIG. 6, these surface points do not belong to the same surface of the scene as the endpoints. Alternatively, points of a background of the scene or of part of the surface of the scene located further away may be located there. In principle, an end of the line can also arise by a capture fault of the laser scanner or by an evaluation fault. However, in the case of a capture result as illustrated in the section 31 of FIG. 6, this is unlikely because there is a plurality of endpoints that all have directly neighboring endpoints on lines extending approximately in parallel fashion. Therefore, the endpoints can be ascertained as edge points of an edge line potentially belonging to a mark surface. The endpoints and consequently potential edge points corresponding to a closed circumferential edge can be quickly and reliably ascertained, in particular by virtue of tracking the lines extending approximately in parallel fashion and also extending approximately in horizontal fashion in the illustration of FIG. 6. It is also possible to ascertain a complete set of edge points corresponding to a closed circumferential edge in an analogous fashion if it is not only a section 31 of the data record that is considered like in FIG. 6.

Figure 7:
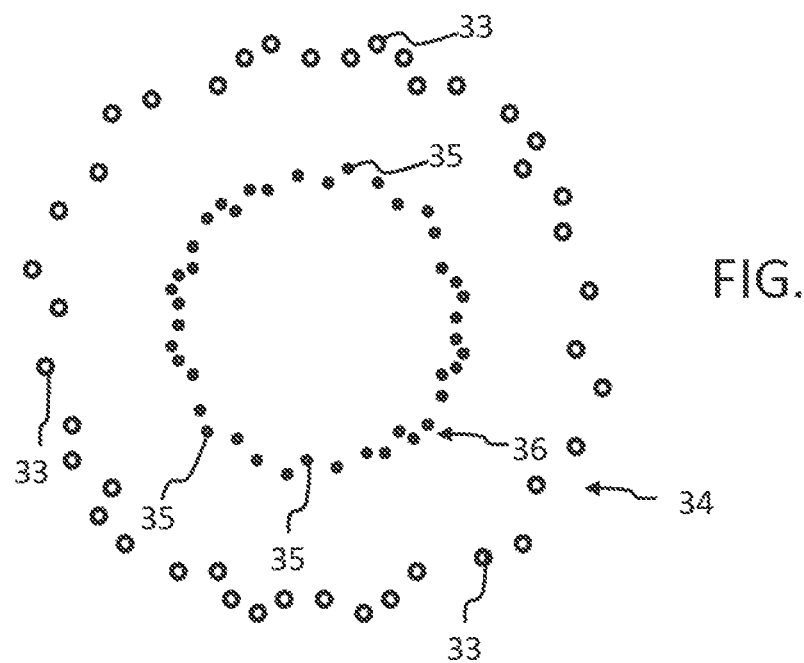
FIG. 7 shows two collections of edge points from a laser scanner data record, which correspond to the outer edge of the circular area and the outer edge of the circular ring of the mark illustrated in FIG. 2.

FIG. 7 shows two collections 34, 36 of edge points 33, 35. Only three of the edge points of the collection 34 are denoted by the reference sign 33 in FIG. 7. Likewise, only three of the edge points of the collection 36 are denoted by the reference sign 35. Both collections 34, 26 come into question as potential nodes of a closed circumferential edge line, namely a circular line in each case, in this example. Not all points of the collection 34, 36 lie exactly on a circular line for various reasons. Firstly, a discrete local resolution because of the discrete scanning of the scene surface by the laser scanner leads to an offset of the potential edge points relative to the points on an ideal image of the edge, i.e., an ideal circular line. Moreover, the systematic deviations, already described above, of the points contained in the data record from the edge points of a mark surface may arise if the reflectivity for the laser radiation changes abruptly at the edge of the mark surface.

The procedure illustrated in FIG. 5 starts in step S1 by loading the data record. In the subsequent step S2, a first collection of edge points are ascertained in the three-dimensional coordinate system of the data record, in particular by the ascertainment device 23 illustrated in FIG. 4. The first collection of edge points potentially contains nodes of a first closed circumferential edge line, which corresponds to the closed circumferential edge of a mark surface. Examples of such collections 34, 36 of edge points are illustrated in FIG. 7.

In particular, a plurality of collections, or all collections, of edge points from the data record can be ascertained in step S2. Alternatively, step S2 can be carried out again later. It is also possible, in step S2, to ascertain collections with edge points that have a small number of edge points, e.g., only three or four edge points, but nevertheless appear to correspond to a closed circumferential edge line. Such collections of edge points with few edge points arise, in particular, because of capture and/or evaluation errors. Prescribing a minimum number of edge points is typical. If the minimum number is not achieved by a collection ascertained in step S2, then this collection is excluded from the further processing for the purposes of determining a mark. This optional identification of those collections of edge points and the exclusion thereof from the further processing is the subject matter of the optional step S3.

In step S4, an equalization area, in particular a plane, is fitted in each collection of edge points ascertained in step S2, in particular by the equalization device 25 illustrated in FIG. 4. In particular, the plane can be defined as optimally fitted plane by virtue of the sum of the squares of the distances of all edge points of the collection of edge points from the plane being minimal.

In the subsequent step S5, every edge point of the collection of edge points not lying in the equalization area is displaced into the equalization area, to be precise, typically, along a normal of the equalization area, in particular the plane, by the displacement device 28 illustrated in FIG. 4. In this way, all points of the corrected collection of edge points obtained thus now lie in the equalization area or approximately in the equalization area according to a local raster of the coordinates, if present. If the plane equalization area extends parallel to two of the coordinate axes of a Cartesian coordinate system, it is possible to consider further only the coordinates in respect of these two coordinate axes for each edge point of the collection of edge points and the third coordinate, which is defined in respect of the third coordinate axis extending perpendicular to the plane equalization area, can be set to correspond to the coordinate value of the plane or can be neglected in the further evaluation.

In the following step S6, which is a typical but optional step, the geometry of the mark surface defined by the corrected collection of edge points is determined. Here, this can be a step that is carried out by the determination device 29 from FIG. 4 and that leads to a determination or preliminary determination of the mark. In particular, an edge line of a form can be fitted into the collection of corrected edge points, said edge line corresponding to the edge of the mark surface of the mark to be determined. This is a circular line in the case of the mark illustrated in FIG. 2. Optionally, it is also possible here to use the known circle radius of the mark area (for example, to obtain a starting value for the fit) or different information about the size of mark surface in the case of a differently formed mark. This assumes that the scale of the information generated by the laser scanner scan is known in relation to the scene. In the case of a circular mark surface such as in the case of FIG. 2, for example, the circle center point can be determined by virtue of the distance or the square of the distance of the edge points considered during the fit being minimized, for example by statistical methods, optionally with additional consideration of prior knowledge of possible systematic errors of the laser scanner scan.

In the subsequent step S7, which is optional just like step S6, it is possible to ascertain whether the result of step S6 corresponds to the mark to be determined or to the mark surface to be determined. In particular, the mark point, which is defined uniquely by the mark or the mark surface, such as the circle center point, for example, must lie within a field of surface points of the data record that is approximately uniformly distributed in continuous fashion to the edge line of the mark surface. Otherwise, like, e.g., in the case of FIG. 7 with respect to the outer collection 34 of edge points, which corresponds to the outer edge line 9 of the mark 4 illustrated in FIG. 2, the mark point does not belong to the mark surface, the edge line of which is defined by the edge points. As an alternative or in addition thereto, geometric checks can be carried out using prior knowledge of the mark or mark surface to be determined. In particular, a check can be carried out as to whether the size of the mark surface defined by the edge line lies within a predetermined length range or area range. By way of example, in the case of a circle, checks can be carried out as to whether the circle radius is greater than a minimum value and/or less than a maximum value.

As a further alternative, or additionally, a check can be carried out in step S7 as to whether the mean deviation of the positions of the corrected collection of edge points or another statistical distribution measure indicates that the corrected edge points of the corrected collection of edge points belong to the edge line potentially defined thereby.

In the case of an unsuccessful check of the corrected collection of edge points in all cases mentioned in relation to step S7, it is possible to decide that this collection of edge points does not correspond to the mark or mark surface to be determined and this collection of edge points can be excluded from the further processing.

In the subsequent, likewise optional step S8, it is possible, in the case of marks that have a plurality of mark surfaces and therefore also a plurality of closed circumferential edges, to ascertain one of these edges as the edge assigned to the corrected collection of edge points or, conversely, to at least preliminarily exclude at least one collection of edge points from the further processing if it does not belong to the mark surface to be determined. In the case of the mark 4 illustrated in FIG. 2, a collection of edge points that corresponds to the outer edge 9 can be excluded from the further processing since the collection of edge points that corresponds to the inner edge 8 defines the edge line of the associated mark surface 6 when determining the circle center point 5 and said collection of edge points is better suited to determining the circle center point 5.

A set of points that correspond to the mark surface to be determined within the edge is ascertained in step S9. Particularly in the case of the interconnected surface points (like in FIG. 6, for example), it is possible to initially establish all points that are connected directly or indirectly to edge points via the connecting lines between respectively two directly neighboring points as potential elements of the set. The edge points themselves may be part of the set. However, the edge points typically do not belong to the set. Moreover, independently of whether or not the evaluated data record includes points that are interconnected to one another, it is typical only to admit those points that are positioned at a distance from the edge points as elements of the set. This can prevent points, that are arranged offset in the edge region of the mark surface because of systematic errors, from being part of the set and making the results of the further processing worse. Various options for ensuring that the points belonging to the set have a distance from the edge have already been discussed. Regarding the specific example of the mark illustrated in FIG. 2, the mark center point determined in preliminary fashion in the preceding steps is assumed. Further, a maximum value for the distance of the points from this preliminary mark center point is prescribed, e.g., as a fraction or percentage of the preliminarily established radius. By way of example, this preliminarily established radius can be the mean distance of the edge points from the preliminarily established mark center point. By way of example, all points from the data record become elements of the set of points, which are located within a percentage value of 75% of the preliminarily established radius about the preliminarily established circle center point.

Figure 8:
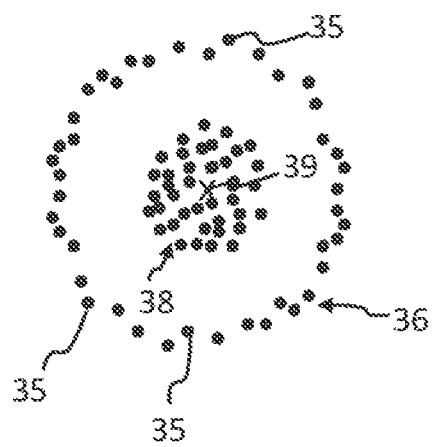
FIG. 8 shows the collection of edge points from FIG. 7, which corresponds to the outer edge of the circular area of the mark illustrated in FIG. 2, and a set of surface points of the circular area, which are located in a central region of the circular area.

FIG. 8 shows a simplified example of a collection 36 of edge points 35 like in FIG. 7, wherein a set 38 of surface points is located in a central region within the edge line (not illustrated in FIGS. 7 and 8) defined by the edge points 35. The preliminarily established circle center point 39 is also located within the partial mark surface defined by this set 38. A ring-shaped surface region is located between the set 38 of surface points and the edge points 35, in which surface region points of the data record are located. However, these points have not been illustrated as they belong neither to the edge points 35 nor to the set 38 of surface points.

In the subsequent step S10, an equalization area, in particular a plane, is fitted into the set of surface points, into the set 38 of surface points in the exemplary embodiment of FIG. 8, by the equalization device 25 in FIG. 4, for example. Since FIG. 8, like FIGS. 6 and 7, is a two-dimensional plan view on the respectively illustrated points of the data record, the points of the set 38 in FIG. 8 do not lie in the image plane and the fitting of a plane equalization area leads to an approximation for the plane mark surface. The surface points of the set 38 will partly lie on one side of the equalization area and partly lie on the other side of the equalization area after the equalization area has been fitted. By way of example, the image plane is an equalization plane obtained by fitting. For the purposes of fixing the equalization area, it is possible to use optimization methods that are based on statistical evaluation variables, known per se. By way of example, the sum of the squares of the distances of the surface points of the set 38 from the equalization area can be minimized. Optionally, it is possible to determine whether the distribution of the distances of surface points of the set 38 from the equalization area suggests that these are surface points corresponding to the mark surface to be determined, for example by forming the standard deviation or another statistical measure. If the scatter or the standard deviation is too large, a decision can be made that the set of surface points, into which the equalization area was fitted, does not correspond to the mark surface to be determined.

In the subsequent step S11, the edge points of the collection of edge points ascertained first or the already displaced edge points of the collection of edge points already corrected at an earlier stage are displaced into the equalization area or into a continuation of the equalization area, for example by the displacement device 28 in FIG. 4. A continuation of the equalization area, in particular within the same plane if this is a plane equalization area, is necessary, for example, if only a small circular area was fitted into the set 38 of surface points illustrated in FIG. 8, the outer edge of said circular area lying in the region of the outer surface points of the set 38. In any case, an improved collection of edge points is obtained by displacing the edge points of the collection of edge points or of the corrected collection of edge points into the equalization area or the continued equalization area since the set of surface points has led to an improved approximation of the mark surface. Secondly, the collection of edge points that is (once again) modified by displacing the edge points represents an improved approximation of the actual edge of the mark surface.

In the subsequent step S12, an edge line is fitted into the displaced edge points, the edge line corresponding to the edge of the mark surface to be determined. This is a circular line in the exemplary embodiment of FIG. 2. Therefore, it is possible to use prior knowledge of the form of the edge line, in particular.

In the subsequent step S13, the mark is determined from the edge line and/or the last fitted equalization area, in particular by the determination device 29. In the case of a circular mark surface with a therefore circular edge line, it is possible, in particular, to determine the associated circle center point. Particularly in the case of the mark illustrated in FIG. 2, the circle center point, i.e., the position defined by the three-dimensional coordinates of the circle center point in the coordinate system of the data record, is the target of determining the mark. This circle center point or, in general, the respective mark point uniquely defined by the mark can be determined not only in the coordinate system of the data record produced by the laser scanner scan but also, for example, in a further data record from another laser scanner scan if the surface regions scanned by the various laser scanner scans overlap one another. If at least three marks lie in the overlapping region, the coordinate systems of the overlapping data records can be registered to one another based on the mark points. A corresponding statement applies to a data record that was obtained not by a laser scanner scan but by photogrammetry, for example.

The described method for determining a mark is advantageous in that it can be carried out quickly and precisely. Particularly in the case of hand-guided laser scanners, the result of the mark determination therefore can be presented to the user within an acceptable period of time and the user can recognize what marks were determined.

FIG. 9 schematically shows a mark 4, like in FIG. 2, with an inner, strongly reflecting circular area 6, which is bounded by a circular line 8, and with an outer, concentric circular ring 7, which likewise has a circular outer edge 9. Further, a plurality of lines 41 that extend in approximately parallel fashion with respect to one another are illustrated. The lines are composed of individual points. These points represent the surface points of the surface region of the scene, in which the mark 4 is located and which are captured by the laser scanner scan. What holds true for each line 41 is that the points lying thereon are captured simultaneously by the laser scanner.

Seven of the lines 41 intersect the area of the circular mark 4. Only four of the lines 41, however, intersect the inner, strongly reflecting circular area 6 at the outer edge 8 thereof.

FIG. 10 shows those sections of these four lines 41, which are located on the outer edge 8 and in the circular area 6, i.e., the mark surface to be determined. FIG. 11 shows a first approximation of a closed circumferential outer edge, which can be obtained from the surface points illustrated in FIG. 10.

However, if prior knowledge is also considered, it is possible to ascertain a substantially better edge line than illustrated in FIG. 11. In particular, the form of the edge line, a circular line, for example, may be known and therefore a circular line can be fitted around the surface points illustrated in FIG. 10. What can be taken into account further here is that the endpoints of the four edge lines 41, which are illustrated in FIGS. 10 and 11, lie close to the edge line while the points between the endpoints of the uppermost and lowermost line 41 illustrated in FIGS. 10 and 11 are positioned further away from the edge line to be determined. Therefore, only the endpoints of the lines 41, for example, can be used to determine the edge line. In relation to the method already described, this means that only the endpoints of the lines are selected for the collection of edge points. FIGS. 9 to 11 represent the situation in a much-simplified form since, in practice, the distances between the lines 41 are very much smaller. The inner circular area of the mark 4 is therefore crossed by a very much larger number of lines.

It is understood that the foregoing description is that of the exemplary embodiments of the invention and that various changes and modifications may be made thereto without departing from the spirit and scope of the invention as defined in the appended claims.

What is claimed is:

1. A method for determining a mark in a data record including three-dimensional surface coordinates of a scene, the mark having at least one first mark surface bounded by a closed circumferential edge, and the three-dimensional surface coordinates of the scene being captured by at least one laser scanner, the method comprising:

ascertaining a first collection of edge points in a three-dimensional coordinate system of the data record, each of the edge points of the first collection being defined by corresponding three-dimensional surface coordinates of the data record, and the edge points of the first collection of edge points forming nodes of a first closed circumferential edge line, which corresponds to the closed circumferential edge of the first mark surface;

fitting an equalization area into at least a subset of the edge points of the first collection of edge points to permit the edge points in the three-dimensional coordinate system to be partly positioned on a first side of the equalization area and to be partly positioned on a second side of the equalization area lying opposite the first side, the equalization area at least one of having a region that substantially corresponds to the first mark surface or approximately corresponding overall to the first mark surface;

displacing edge points of the first collection of edge points into the equalization area to permit a corrected collection of edge points to be formed, the edge points of the corrected collection of the edge points forming nodes of a corrected closed circumferential edge line which corresponds to the closed circumferential edge of the first mark surface, and the corrected closed circumferential edge line having a greater number of nodes in the equalization area in comparison with the closed circumferential edge line; and determining the mark in the three-dimensional coordinate system based on at least one of the corrected collection of edge points or the corrected closed circumferential edge line.

2. The method as claimed in claim 1, wherein the equalization area is a plane equalization area.

3. The method as claimed in claim 1, further comprising:
displacing the edge points of the first collection of edge points into the equalization area by a displacement in a direction of respectively one surface normal of the equalization area.

4. The method as claimed in claim 1, wherein:
at least one of the mark or the first mark surface uniquely defines at least one mark point, and
the at least one mark point is determined in the three-dimensional coordinate system based on at least one of the corrected collection of edge points or the corrected closed circumferential edge line.

5. The method as claimed in claim 1, further comprising:
ascertaining a set of points with surface coordinates of the scene in the data record based on at least one of the corrected collection of edge points or the corrected closed circumferential edge line, the set of points lying along the equalization area within the corrected closed circumferential edge line but not on at least one of the first closed circumferential edge line or the corrected closed circumferential edge line; and
fitting a second equalization area into the set of points to permit the points of the set of points in the three-dimensional coordinate system to be partly positioned on a first side of the second equalization area and on a second side of the second equalization area lying opposite the first side.

6. The method as claimed in claim 1, further comprising:
displacing at least one of the edge points of the first collection of edge points or the edge points of the corrected collection of the edge points into the second equalization area to permit a second corrected collection of edge points to arise, the edge points of the second corrected collection of the edge points forming nodes of a second corrected closed circumferential edge line which corresponds to the closed circumferential edge of the first mark surface.

7. The method as claimed in claim 1, wherein:
at least one of the mark or the first mark surface uniquely defines at least one mark point, and
the at least one mark point is determined in the three-dimensional coordinate system based on at least one of the second corrected collection of edge points or the second corrected closed circumferential edge line.

8. The method as claimed in claim 1, wherein the first mark surface bounded by the closed circumferential edge is a surface with a first reflectivity for a laser radiation of the laser scanner that is higher than a second reflectivity of at least one second mark surface that lies beyond the closed circumferential edge of the first mark surface and that adjoins the closed circumferential edge.

9. The method as claimed in claim 1, further comprising:
setting an illumination of the scene by the laser scanner to a level at which the laser scanner captures no surface points from the second mark surface; and
ascertaining the edge points of the first collection of edge points by considering that the data record contains no directly neighboring surface points that lie in a region of the three-dimensional coordinate system corresponding to the second mark surface.

10. The method as claimed in claim 1, further comprising:
simultaneously irradiating the scene successively through respectively one spatial region by laser radiation when capturing the surface coordinates of the scene, the spatial regions having straight lines of intersection with their cross-sectional areas to permit the laser scanner to simultaneously record measurement points of the surface coordinates of the scene that are arranged successively along a line-like profile of the respectively simultaneously illuminated surface region of the scene, and wherein, when at least one of the first collection of edge points in the three-dimensional coordinate system of the data record is ascertained or the equalization area is fitted into at least one subset of the edge points of the first collection of edge points, the closed circumferential edge of the first mark surface is captured more accurately on account of the line-like profile of the laser scanner when the closed circumferential edge intersects the line-like profile at an angle of intersection deviating less from 90 degrees than if the closed circumferential edge intersects the line-like profile at an intersection angle deviating more from 90 degrees or if said closed circumferential edge is tangential to the line-like profile.

11. The method as claimed in claim 1, further comprising:
successively capturing surface coordinates of the scene in a first and a second capture process, the second capture process being carried out before or after the first capture process, the first capture process obtaining the data record used to determine the mark, and the second capture process obtaining a second data record, from which surfaces of the scene outside of the mark arranged in the scene or outside of the marks arranged in the scene are determined, and wherein at least one of:
the laser scanner captures reflected radiation of the scene with a lower amount of radiation per captured solid angle in the first capture process than in the second capture process,
a frequency of a repeated irradiation of the scene by laser radiation and capture of the radiation reflected by the scene by the laser scanner is higher in the first capture process than in the second capture process,
a recording device of the laser scanner receives and records reflected laser radiation from a smaller solid angle range in the first capture process than in the second capture process, or
a local resolution during a simultaneous capture of the radiation reflected by the scene by the laser scanner is lower in the first capture process than in the second capture process.

12. An arrangement for determining a mark in a data record with three-dimensional surface coordinates of a scene, the mark having at least one first mark surface that is bounded by a closed circumferential edge, the surface coordinates of the scene being captured by at least one laser scanner, the arrangement being configured to carry out the method as claimed in claim 1, the arrangement comprising:
an ascertainment device configured to ascertain a first collection of edge points in a three-dimensional coordinate system of the data record, each of the edge points of the first collection being defined by corresponding three-dimensional surface coordinates of the data record, and the edge points of the first collection of edge points forming nodes of a first closed circumferential edge line, which corresponds to the closed circumferential edge of the first mark surface;

an equalization device configured to fit an equalization area into at least a subset of the edge points of the first collection of edge points to permit the edge points in the three-dimensional coordinate system to be partly positioned on a first side of the equalization area and partly positioned on a second side, lying opposite the first side, of the equalization area, the equalization area having a region that approximately corresponds to the first mark surface or the equalization area overall approximately corresponds to the first mark surface;

a displacement device configured to displace edge points of the first collection of edge points into the equalization area to permit a corrected collection of edge points to be formed, the edge points of the corrected collection of edge points forming nodes of a corrected closed circumferential edge line, which corresponds to the closed circumferential edge of the first mark surface, and the corrected closed circumferential edge line having a greater number of nodes in the equalization area in comparison with the closed circumferential edge line, and a determination device configured to determine the mark in the three-dimensional coordinate system based on the corrected collection of edge points or the corrected closed circumferential edge line.

* * * * *